United States Patent Office 2,922,722
Patented Jan. 26, 1960

2,922,722
METHOD OF PRODUCING A CARBON BODY OF INCREASED DENSITY

John Malcolm Hutcheon, Abingdon, England

No Drawing. Application December 2, 1957
Serial No. 699,907

Claims priority, application Great Britain
November 30, 1956

4 Claims. (Cl. 117—46)

The invention relates to methods of producing impermeable carbon bodies and the improved carbon bodies produced thereby. In particular, it relates to the production of impermeable graphite and the improved graphite produced thereby.

An object of the invention is to produce a dense graphite having a low permeability to gases and liquids and a low porosity, and also having desirable thermal properties namely low thermal expansion and high thermal conductivity in all directions.

It is known to produce a very dense impermeable graphite by heating a carbon rod to a temperature at which gaseous carbonisable compounds are cracked to produce carbon, and supplying the gaseous compounds to the surface of the carbon rod so that a deposit of highly-oriented graphite is built up on the said surface. This graphite, however, being highly-oriented parallel to the surface, has a high coefficient of expansion and low thermal conductivity in the radial direction, which is undesirable for applications where mechanical stability and rapid heat transfer are required.

Porous and permeable carbon bodies, of comparatively low density, are produced by hot-compacting coke carbon with a binder, such as pitch; such bodies are converted to graphite, also porous and permeable and of comparatively low density, by heating to a graphitising temperature.

According to the invention, a high-density, substantially impermeable carbon body comprises a pre-formed permeable carbon body which has had deposited within its pores crystallites of highly-oriented graphite produced by the cracking of a gaseous carbonisable compound within the said pores.

One method according to the invention, for producing a high-density impermeable carbon body, comprises maintaining a temperature gradient within a pre-formed permeable carbon body, such that a surface area of the said permeable carbon body is at a temperature below that at which cracking of the gaseous carbonisable compound to form graphite occurs, and at least part of said permeable carbon body is at a temperature above that at which said cracking occurs, and supplying said gaseous compound to said surface area.

By this method the gaseous compound penetrates into the permeable carbon body and is cracked within the pores to form crystallites of graphite therein, but no cracking occurs on the surface of the carbon body.

Another method according to the invention, for producing a high-density, impermeable carbon body comprises heating a zone of a pre-formed permeable carbon body to a temperature at which cracking of said gaseous compound to form graphite occurs, moving the heated zone through the permeable carbon body, and simultaneously supplying said gaseous compound to the permeable carbon body so as to meet the advancing front of the heated zone.

By this method, the gaseous compound is cracked to form crystallites of graphite within the pores of the permeable carbon body as the heated zone is moved through it.

By either of these methods, a high-density, impermeable carbon body is produced, which has substantially no crystalline graphite on its surface, and contains randomly oriented crystallites of graphite within its structure. Thus, the structure as a whole is substantially unoriented, and has good thermal conductivity and low thermal expansion in all directions.

The pre-formed permeable carbon body may be either already graphitised or ungraphitised. In the former case, the product of the invention is a high-density, impermeable graphite; in the latter case, the product of the invention may be treated by heating to a graphitising temperature to form a high-density, impermeable graphite.

The gaseous carbonisable compound used may be a hydrocarbon gas or vapour, for example methane, ethane, propane, higher aliphatic hydrocarbons or acetylene, or mixtures thereof, or an oxygen-containing gas or vapour, such as aliphatic alcohols, furane derivatives, and the like. Particularly suitable compounds are the lower aliphatic hydrocarbons, such as propane, which crack to form carbon deposits at temperatures above about 1000° C. Another suitable class of compounds consists of cyclic-oxygen containing alcohols, for example furfuryl alcohol.

The first method according to the invention, namely that in which a surface of the permeable carbon body is maintained below the cracking temperature, and a temperature gradient is maintained within the carbon body so that at least part of the carbon body is above the cracking temperature, may be achieved, for example, by internally heating a rod of permeable carbon or graphite to a temperature above the cracking temperature, cooling the surface of the rod by radiation or otherwise to a temperature below the cracking temperature and supplying the gaseous carbonisable compound to the surface of the rod. It may also be achieved by externally heating a tube of permeable carbon or graphite to a temperature above the cracking temperature, cooling the internal surface of the tube, for example, by means of a conduit through which flows a cooling fluid, to a temperature below the cracking temperature, and supplying the gaseous carbonisable compound to the internal surface of the tube.

The second method according to the invention, namely that in which a heated zone is passed through the permeable carbon body, may be achieved by moving a permeable carbon or graphite rod through an annular heating element, e.g. an electrical induction heating coil, so that the temperature of a zone of the rod within the heating element is above the cracking temperature, and supplying the gaseous carbonisable compound to one end of the rod in such a way that the compound passes through the pores of the rod and meets the heated zone of the rod within the rod. Escape of the gaseous compound through the surface of the rod before reaching the heated zone may be prevented by coating the rod with a material which is impermeable to the gaseous compound but which is burnt away by the heated zone as the zone passes through the rod. A suitable material for coating the rod is silicon carbide, which breaks down at about 2200° C. By maintaining the heat zone above 2200° C., the silicon carbide is burnt away as the zone passes through the rod and the gaseous compound is carbonised in a narrow zone in the front of the heated zone.

The invention will be more readily understood by reference to the following example, in which a preferred method of carrying it into effect will be described.

*Example*

A tube of preformed, permeable graphite of density 1.60 g./cc., 18 inches long and having an external diameter of 4 inches and an internal diameter of 1 inch, was fitted onto a double-walled cooling conduit of outside diameter ⅞ inch in the following manner to ensure good thermal contact between the cooling conduit and the graphite: a helical groove of pitch ¼ inch and depth ⅛ inch was cut on the inner surface of the tube and the tube was then screwed onto a corresponding helical fin $3/16$ inch high on the outer surface of the cooling conduit. Positive contact between the graphite and the cooling conduit was maintained by spring-loaded sealing members having circular knife edge seals bearing on each end of the graphite tube. The cooling conduit was cooled by passing water through the tube formed by the inner wall of the conduit and back through the annular space between the inner and outer walls of the conduit. The cooling water thus conveniently entered and left the cooling conduit at one end thereof. The sealing members were also water cooled. The graphite tube was heated by radiant heat from a cylindrical heating element surrounding the graphite tube but not in contact therewith, the heating element being heated electrically. The temperature of the inner surface of the graphite tube was measured by thermocouples and the outer surface by thermocouples and by an optical pyrometer. The temperature of the outer surface of the graphite tube was raised to about 1200° C. by means of the electrically heated element and the cooling water circulated at such a rate that bulk boiling of the water did not ossur. Some surface boiling at the outer wall of the double-walled conduit did, however, occur. The temperature of the inner surface of the graphite tube was then estimated to be about 600° C. and that of the helical fin on the outer surface of the cooling conduit about 200° C. The space between the graphite tube and the heating element was then evacuated to a pressure equivalent to about 1 mm. of mercury. After an initial period to allow degassing of the graphite tube, propane gas was supplied at about 5 p.s.i. to the helical space ⅟₁₆ inch thick between the inner surface of the graphite tube and the outer surface of the cooling conduit. Carbonisation of the propane gas occurred in a zone within the thickness of the graphite tube, the propane being cracked lites of graphite. The hydrogen and other gases produced by said cracking diffused out to the vacuum at the outer surface of the graphite tube as long as the tube remained permeable. When cracking of the propane gas ceased, the graphite tube was cooled and removed, and was found to have an increased mean density of greater than 1.70 gm/cc. and to be substantially impermeable compared with original graphite tube.

I claim:
1. A method of producing a carbon body of increased density and decreased permeability, comprising the steps of maintaining a temperature gradient within a permeable carbon body such that a surface area of the body is at a lower temperature than the remainedr of the body, supplying a gaseous carbonisable compound only to said surface area, the temperature of said surface area being below that at which cracking of the carbonisable compound occurs to form carbon, the temperature of at least part of the remainder of the body being above that at which said cracking occurs, whereby carbon is deposited only in the pores of the body and not on the said surface area.

2. A method according to claim 1, in which said carbon body is ungraphitised carbon and in which said carbon body is subsequently subjected to a further graphitising process.

3. A method according to claim 1, in which said permeable carbon body is in the form of a rod, the surface of which is at a temperature below said cracking temperature and at least part of the interior of which is at a temperature above said cracking temperature, and said gaseous compound is supplied to the surface of the rod.

4. A method according to claim 1, in which said permeable carbon body is in the form of a tube, the inner surface of which is at a temperature below said cracking temperature, the outer surface of which and at least part of the interior of said body is at at a temperature above said cracking temperature, and said gaseous compound is supplied to the inner surface of the tube.

References Cited in the file of this patent

UNITED STATES PATENTS

| | | |
|---|---|---|
| 1,470,300 | Szaruasy | Oct. 9, 1923 |
| 2,392,682 | Marek | Jan. 8, 1946 |
| 2,587,523 | Prescott | Feb. 26, 1952 |
| 2,789,038 | Bemmett et al. | Apr. 16, 1957 |
| 2,817,605 | Sanz et al. | Dec. 24, 1957 |

UNITED STATES PATENT OFFICE

CERTIFICATE OF CORRECTION

Patent No. 2,922,722

January 26, 1960

John Malcolm Hutcheon

It is hereby certified that error appears in the above numbered patent requiring correction and that the said Letters Patent should read as corrected below.

In the grant, lines 1, 2 and 3, for "John Malcolm Hutcheon, of Abingdon, England," read -- John Malcolm Hutcheon, of Abingdon, England, assignor to The United Kingdom Atomic Energy Authority of Patents Branch, of London, England, --; line 12, "John Malcolm Hutcheon, his heirs or assigns" read -- The United Kingdom Atomic Energy Authority of Patents Branch --; in the heading to the printed specification, line 4, for "John Malcolm Hutcheon, Abingdon, England" read -- John Malcolm Hutcheon, Abingdon, England, assignor to The United Kingdom Atomic Energy Authority of Patents Branch, London, England --.

Signed and sealed this 21st day of June 1960.

(SEAL)
Attest:

KARL H. AXLINE
Attesting Officer

ROBERT C. WATSON
Commissioner of Patents